Figure 1:
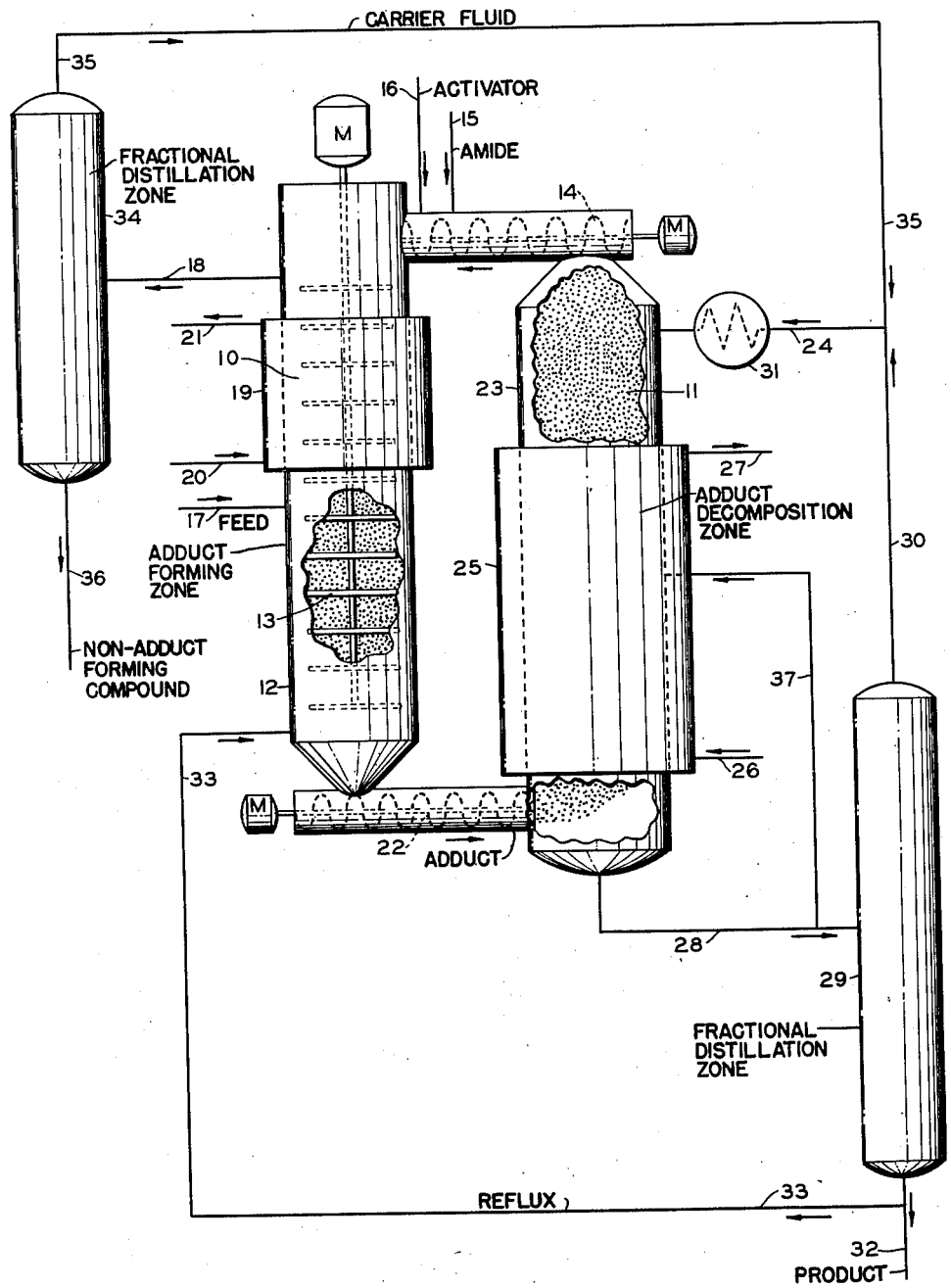

INVENTOR.
C. S. LYNCH

Patented May 26, 1953

2,640,051

UNITED STATES PATENT OFFICE 2,640,051

PROCESS FOR THE DECOMPOSITION OF UREA AND THIOUREA ADDUCTS

Charles S. Lynch, Bartlesville, Okla., assignor to Phillips Petroleum Company, a corporation of Delaware Application December 4, 1950, Serial No. 198,965

15 Claims. (Cl. 260—96.5)

This invention relates to a process for separating organic compounds from a mixture containing same. In one of its aspects, this invention relates to a process for separating a compound capable of forming an adduct with an amide selected from the group consisting of urea and thiourea from a mixture containing the same and for decomposing an adduct thus-formed. In another of its aspects, this invention relates to a method for transporting such an adduct and/or said amide by employing a hydraulic medium to effect said transportation. In still another aspect, it relates to a process for concomitantly decomposing and transporting such an adduct by means of a hydraulic medium and, further, for using said medium as a washing agent for the liberated amide.

There has been recently discovered a process for the separation of organic compounds which process permits the separation of a class of compounds having one type of molecular arrangement from a class of compounds having a different molecular arrangement. Thus, straight carbon atom chain hydrocarbons can be separated, individually or as a class, from branched carbon atom chain and/or cyclic hydrocarbons independently of the boiling points of the compounds being separated. This process depends upon the peculiar property of urea ($CO(NH_2)_2$) which permits it to form adducts with organic compounds having straight carbon atom chains and yet not to form adducts with branched-chain or cyclic organic compounds. The adducts formed in such a process are readily separable by filtration or other suitable means from the organic compounds that form no adducts with urea, and then the adducts are disassociated or decomposed to recover the urea and the adduct-forming compounds.

While urea forms adducts with organic compounds having straight carbon atom chains, thiourea ($CS(NH_2)_2$) forms adducts with organic compounds having branched or cyclic carbon atom chains of certain types. Thus, the adduct-forming property of thiourea permits a separation of such organic compounds from organic compounds having straight carbon atom chains, since the latter do not form adducts with thiourea.

It has also been known that particles of an amide selected from the group consisting of urea and thiourea can be maintained as a downwardly moving columnar mass in a reaction zone and then contacted countercurrently with a feed comprising an adduct-forming compound admixed with a non-adduct-forming compound to form an adduct which can be separated from the non-adduct-forming compound. The adduct, as stated, can be decomposed to liberate said amide which can be returned to the reaction zone for re-use therein. However, to be so returned, the amide must be elevated to the upper portion of the reaction zone and, in methods heretofore used, such elevation was accomplished by mechanical means such as bucket elevators, screw conveyors and the like, with the result that some of the particles of the amide were crushed into unusable fines by such mechanical means. When it is desired to elevate particles of an adduct, the use of such mechanical means results in even more attrition of such adduct particles. Obviously, the formation of fine particles of amide is undesirable since they tend to contaminate the product organic compounds and further to plug the moving bed of amide in the adduct-forming zone.

It is an object of this invention to provide a novel process for separating an organic compound from a mixture containing the same.

It is another object of this invention to employ an amide selected from the group consisting of urea and thiourea to separate an adduct-forming compound from a non-adduct-forming compound.

It is another object of this invention to provide a process for forming an adduct and for decomposing said adduct.

It is still another object of this invention to provide a process for decomposing an adduct and for transporting particles of said adduct and/or the resulting liberated amide by hydraulic means to thereby avoid attrition of said particles.

It is yet another object of this invention to provide a method for transporting particles of amide and/or adduct without grinding the same into undesirably fine sizes.

Other objects, advantages and features of this invention will be readily apparent to one skilled in the art upon a consideration of this disclosure, the attached drawings and the appended claims.

It has now been found that a solid adduct formed by reacting an amide selected from the group consisting of urea and thiourea with an adduct-forming organic compound, particularly an adduct-forming compound in admixture with a non-adduct-forming compound, can be decomposed to liberate the selected amide and the adduct-forming compound by contacting said adduct with a heated non-reactive-carrier fluid having a specific gravity higher than said adduct or said liberated amide. The particles of adduct and of the amide, as it is liberated, are transported upwardly through the carrier fluid by reason of the difference in specific gravity therebetween. In such fashion, the adduct and/or amide can be elevated without any substantial attrition thereof. It has been further found that the carrier fluid can be passed downwardly and countercurrently to the particles of adduct and/or amide rising therethrough in such a manner that the particles are massed into an upwardly disposed bed, or preferably, a plurality of succeeding beds, which are in the nature of a mass of fluent solids agitated by the downwardly moving carrier fluid and maintained in the upwardly disposed position by the buoyancy of said particles in said carrier fluid. The non-reactive carrier fluid is employed not only as a buoying medium for the particles but it can also serve as a heat carrier and as an agitating means. Further, it can, under proper circumstances, serve as a washing medium to remove occluded impurities from the adduct and/or the amide.

Figure 2:
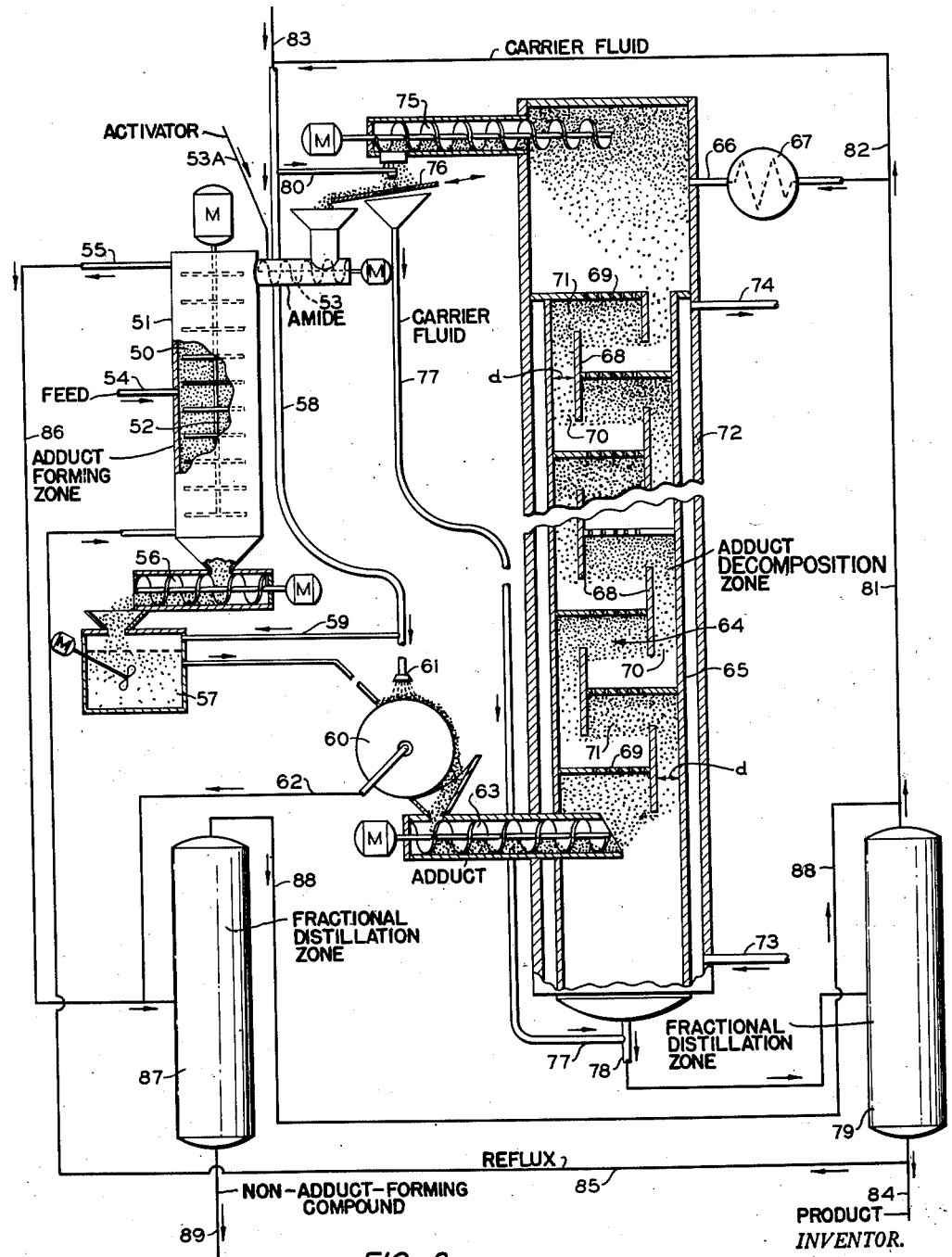

In order to more clearly explain the invention, it will be described in several embodiments with particular reference to the attached drawings wherein Figures 1 and 2 represent preferred embodiments of the process of this invention.

Referring to Figure 1, there is shown an adduct forming zone 10 and an adduct decomposition zone 11. Adduct forming zone 10 can be a vertically disposed vessel 12 equipped with a suitable stirring apparatus 13 such as a rotatable axial shaft bearing a plurality of mixing vanes or arms as shown. The particles of amide selected from the group consisting of urea and thiourea are introduced into vessel 12 by means of a solids transporting apparatus such as auger 14 from a source to be described hereinafter. Make-up amide can be added as required through line 15. The amide thus disposed in vessel 12 moves downwardly therethrough by gravity as a columnar mass or moving bed and is preferably agitated by stirring apparatus 13. A solvent-activator, described more fully below, can be introduced through line 16 to activate the amide preparatory to the adduct forming reaction.

A feed mixture of organic compounds to be separated, comprising an adduct-forming organic compound and a non-adduct-forming compound, is introduced into vessel 12 via line 17 at a point preferably intermediate the ends of adduct-forming zone 10. As the feed mixture contacts the downwardly moving mass of amide under adduct-forming conditions described more fully below, the adduct-forming organic compound reacts with the amide to form a solid adduct which is carried downwardly as part of the moving bed. The non-adduct-forming compound remains in the liquid state and is withdrawn from vessel 12 through line 18. As a result, there is an upward flow of feed liquid countercurrent to the descending amide and the principal portion of the adduct forming reaction will occur between the point at which the feed mixture is introduced and the point at which the non-adduct-forming compound is withdrawn. Such adduct forming reaction is exothermic and there is provided a cooling means such as jacket 19 through which is circulated a cooling medium via lines 20 and 21.

As the adduct is formed in the upper portion of adduct forming zone 10 by reaction of the amide with the adduct-forming organic compound, the amide particles tend to grow in size, become lighter in weight and soft and fluffy in nature. Accordingly, there is a tendency for the adduct as it is formed to bridge across and to plug vessel 12. Agitating or stirring apparatus 13 should provide a gentle agitation sufficient only to prevent plugging of vessel 12. Since the adduct particles are rather easily pulverized, it is important that the agitation be not excessively vigorous in order to prevent the formation of an undue amount of fine particles of adduct which would, when decomposed to liberate the amide and then recycled, cause the moving bed of amide to become even more easily plugged and would tend to contaminate the organic compound products with the unremovably fine particles of amide.

As stated, the adduct moves downwardly as part of the moving bed and will be removed from the lower portion of adduct forming zone 10 by means of auger 22 or other suitable solids moving means. The adduct is discharged from auger 22 into decomposition zone 11 which can comprise a vertically disposed vessel 23. An inert carrier fluid is introduced into the upper portion of vessel 23 through line 24. As will be explained more fully hereinafter, the carrier fluid has a higher specific gravity than the adduct and/or the amide. The rate of flow of the carrier fluid is adjusted to be such that the adduct will rise therein by reason of its buoyancy. The rising adduct and/or liberated amide is prevented from rising at the rate dictated by its natural buoyancy in a stagnant carrier fluid by the downward velocity of the carrier fluid. This velocity can be so adjusted that the adduct or amide forms a fluent bed of particles in the upper portion of decomposition zone 11 and the depth and density of such bed can be readily controlled by varying the downward velocity of the carrier fluid. As the carrier fluid passes downwardly through vessel 23, it is heated by a suitable heating means such as jacket 25 through which is circulated a heating medium such as steam or hot water from line 26 to line 27. The heated carrier fluid contacts the ascending adduct and heats it to its decomposition temperature thereby liberating the amide and the adduct-forming organic compound. The liberated amide, which is in particulate form, continues to rise through the carrier fluid and is washed free from occluded liberated adduct-forming compound by the carrier fluid in the upper portion of vessel 23. The washed amide can then be returned to adduct forming zone 10 by means of auger 14. The liberated adduct-forming compound is dissolved in the carrier fluid and removed from vessel 23 via line 28 to a fractional distillation zone 29. In such zone, the carrier fluid is separated from the adduct-forming compound and can be returned to the upper portion of vessel 23 via lines 30 and 24 and heat exchange means 31. Heat exchange means 31 can be employed to either cool or heat the carrier fluid to a temperature such that it will cool the liberated amide in the upper portion of vessel 23 to a proper temperature for the adduct forming reaction in vessel 12.

The adduct-forming organic compound recovered in fractional distillation zone 29 can be removed as a product of the process through line 32. A portion of such compound is preferably returned as reflux to the lower portion of adduct forming zone 10 by means of line 33. When reflux is employed for adduct forming zone 10, any non-adduct-forming organic compound which tends to accompany the adduct removed from the lower portion of such zone is forced upwardly therein by the reflux thereby substantially preventing the non-adduct-forming compound from contaminating the adduct-forming organic compound liberated in decomposition zone 11 and withdrawn therefrom as a product via line 32.

The non-adduct-forming compound withdrawn from adduct forming zone 10 via line 18 can be passed to a fractional distillation zone 34 wherein any carrier fluid which may accompany the amide through auger 14 to then pass out through line 18 with the non-adduct-forming compound can be separated therefrom and returned via line 35, heat exchange means 31 and line 24 to decomposition zone 11. The non-adduct-forming compound is removed from distillation zone 34 via line 36.

A portion of the carrier fluid containing liberated adduct-forming compound can be returned to vessel 23 by line 37 or by a plurality of such lines suitably connected to vessel 23 at different elevations. This returned carrier fluid can be employed to control the density and degree of agitation of the lower portion of the bed of fluent particles existing in vessel 23 without affecting the upper portion of such bed. In addition, the carrier fluid becomes enriched with liberated adduct-forming compound thereby decreasing the load on fractional distillation zone 29. When operating in this manner, only enough carrier fluid can be passed through line 24 to provide a mild agitation of the liberated amide in the upper portion of vessel 23 in order to prevent clogging thereof and to cool and wash said amide preparatory to its return to adduct forming zone 10. The remainder of the carrier fluid necessary to provide the necessary agitation and heat to the adduct contained in the lower portion of the bed in vessel 23 can be passed through line 37. A heater (not shown) can be inserted in line 37 to augment or even supplant the heating function of jacket 25.

As stated, the carrier fluid of this invention can be employed to lift an adduct and/or amide from one point to another. Thus, jacket 25 and its heating function can be omitted from vessel 23 of Figure 1 and the vessel 23 employed merely as a lifting agency for the adduct from auger 22. In such event, the carrier fluid need not be circulated but can remain quiescent and the adduct merely permitted to rise therethrough. However, some downward movement of the carrier liquid is preferably employed to prevent any plugging of vessel 23 with the adduct. After being elevated, the adduct can be decomposed in a separate vessel, such as by heating, and the liberated amide returned to vessel 12 without any further elevation. Alternatively, the adduct from auger 22 can be decomposed and then the liberated amide passed to the lower end of vessel 23 (minus the jacket 25 and with or without means for circulating the carrier fluid contained therein) to rise through the carrier fluid contained therein. Thus, it is apparent that either an adduct or an amide can be elevated hydraulically without causing any substantial attrition of the particles thereof.

Referring to Figure 2, there is shown an adduct forming zone 50 comprising a vertically disposed vessel 51 equipped with an agitation or stirring apparatus 52. The particulate amide, after being activated by a suitable activator from line 53A, is introduced into vessel 51 via auger 53 to progress downwardly therethrough as a columnar mass or moving bed. The feed comprising a mixture of an adduct-forming and a non-adduct-forming organic compound is introduced into vessel 51 by line 54. Non-adduct-forming compound is withdrawn from vessel 51 through line 55 while the adduct-forming compound is withdrawn from the lower portion thereof in the form of a solid particulate adduct. Thus it can be seen that the operation of adduct forming zone 50 is similar to that of adduct forming zone 10 of Figure 1 and the more detailed description given for zone 10 of Figure 1 is equally applicable to zone 50 of Figure 2.

The particles of adduct from vessel 51 are passed through auger 56 to a slurry vessel 57 wherein a slurry is formed with a carrier fluid from lines 58 and 59. The resulting slurry is filtered on a rotary filter 60 or equivalent to separate the adduct from the carrier fluid and any non-adduct-forming organic compound which may accompany the adduct from vessel 51. Additional carrier fluid can be sprayed by line 61 over the adduct filter cake to wash same. The carrier fluid and non-adduct-forming compound is removed via line 62 and the adduct filter cake can be removed from the filter and carried by auger 63 into the lower portion of decomposition zone 64 which can comprise a vertically disposed vessel 65.

Into the top of vessel 65 is introduced a carrier fluid from line 66 and heat exchange means 67. Inside of vessel 65 are disposed a plurality of upcomers 68 each of which can comprise a plate disposed vertically in vessel 65 and joined to the walls thereof at their lateral edges in such a manner to provide a passageway between themselves and the nearest adjacent wall of the vessel 65. Each upcomer 68 supports a perforate member 69, such as a screen or mesh wire, which is also attached to the walls of vessel 65. Perforate members 69 are so fashioned that their area immediately below an adjacent but superposed upcomer is imperforate while their remaining area is perforate. Upcomers 68 alternate, one with the other, in position with respect to their nearness to the walls of vessel 65 as shown. Preferably, the upper end of each upcomer extends upwardly a short distance above the lower end of the next preceding opposite upcomer. The upcomers 68 are situated a distance "d" from the nearer wall of vessel 65 and such distance is preferably about equal to 0.5 of the radius of vessel 65 although it can be varied to provide a larger or smaller passageway between upcomers 68 and the nearer wall of vessel 65.

In operation, the carrier fluid introduced into column 65 through line 66 flows downwardly through the perforate portion of members 69 which pathway offers less resistance to flow than the tortuous path through the succeeding upcomers. Thus, substantially no carrier fluid will flow through the area between the upcomers and the walls of vessel 65 nearest them (i. e. passageway 70) and the principal portion of such fluid flow will be through the central passageway 71 defined by adjacent and succeeding upcomers. The particles of adduct and/or amide will rise upwardly in the carrier liquid in vessel 65 and form therein a plurality of fluent beds of such particles, each bed lying beneath a perforate member 69 as shown. The downflowing carrier fluid will cause each of these beds to be gently agitated. The particles of adduct and/or amide will accumulate beneath each perforate member 69, as stated, until the resulting bed becomes of sufficient depth that the particles will tend to flow past the lower edges of upcomers 68 and enter passageways 70. Since there is comparatively little downward carrier fluid movement in these passageways, the particles will rise therein until they join the particles in the next bed thereabove. The rate of carrier fluid flow through vessel 65 is adjusted to be such that each of the individual beds of particles are gently agitated without causing them to be disrupted to such an extent that any substantial quantities of the particles are carried downwardly with the carrier fluid to a next lower bed. The size and number of the openings in perforate members 69 are so adjusted that the velocity of the carrier fluid therethrough is high enough to substantially prevent any of the particles from passing upwardly through members 69 and yet not so high as to result in sufficient pressure drop therethrough to cause any but a minor portion of the carrier fluid to pass through passageways 70.

Vessel 65 is equipped with a means for heating its contents, such as jacket 72. Sufficient heating medium is circulated in jacket 72 by means of lines 73 and 74 to heat the carrier fluid and adduct passing therethrough to a temperature sufficiently high to ensure that the adduct is decomposed into amide and the adduct-forming organic compound. The liberated amide continues to ascend in vessel 65, is washed and cooled in the upper portion thereof by the carrier fluid and is finally accumulated in the top thereof to be removed by auger 75 which discharges the amide and any accompanying carrier fluid onto vibrating screen 76. The carrier fluid passes through screen 76 and is carried by line 77 to line 78 and fractional distillation zone 79. The amide is deposited by screen 76 into auger 53 to be returned to vessel 51. A portion of carrier fluid can be sprayed by line 80 onto the amide on screen 76 to wash it free from any occluded impurities.

The carrier fluid dissolves the liberated adduct-forming organic compound in vessel 65 and is removed therefrom through line 78 to be fractionally distilled in fractional distillation zone 79. The separated carrier fluid is returned via line 81, heat exchange means 67, wherein its temperature is adjusted to be such that it will cool the amide to a temperature proper for the adduct reaction, and line 66 to the upper portion of vessel 65 and a portion can be passed through line 82 to line 58 to serve the washing and slurrying functions described above. Make-up carrier fluid can be injected into the system through line 83 or at any other suitable point.

The adduct-forming organic compound separated in zone 79 is preferably passed to storage through line 84 but a portion thereof can be returned to the lower portion of vessel 51 via line 85 as reflux which substantially prevents the non-adduct-forming compound from passing with the adduct out the bottom of vessel 51. When employing reflux, filter 60 and vessel 57 can be eliminated.

The non-adduct-forming compound from line 55 and vessel 51, if contaminated with carrier fluid, can be passed through line 86 to be fractionated in fractional distillation zone 87. The filtrate from filter 60 can also be fractionated in this same zone. The separated carrier fluid can be returned via line 88 to line 81 while the non-adduct-forming compound can be withdrawn through line 89 as a product.

Although the concept of this invention is applicable to a process for forming an adduct of any compound capable of forming an adduct with an amide selected from the group consisting of urea or thiourea and to a process for the separation of any compound capable of forming an adduct with urea or thiourea from admixture with a compound not capable of forming such adduct with urea or thiourea under the conditions employed in the adduct-forming zone, a general description of the types of compounds which do and do not form adducts will be given in order to better illustrate the applicability of the process of this invention.

In general, an adduct can be formed by contacting a straight carbon atom chain organic compound with urea in the presence of an activator-solvent, such as methanol, water, or the like. Alternatively, a branched carbon atom chain compound can be contacted with thiourea in the presence of such an activator-solvent to produce an adduct. The straight-chain compound can be admixed with a branched-chain organic compound, the latter of which, in general, do not form adducts with urea. The straight-chain compound can comprise one or more of a normal alkane or alkene hydrocarbon having from 6 to 50 carbon atoms in the molecule, such as hexane, the hexenes, heptane, the heptenes, octane, the octenes, nonane, the nonenes, decane, the decenes and progressively higher molecular alkanes and alkenes including those having 50 carbon atoms. The straight carbon atom chain compound can also be a primary alcohol having from 6 to 50 carbon atoms and being saturated or unsaturated and thus corresponds in carbon atom configuration to the straight-chain hydrocarbons above-mentioned. Urea will also form adducts with such straight carbon atom chain compounds as primary amines having from 6 to 50 carbon atoms per molecule, mercaptans having from 6 to 50 carbon atoms per molecule, ketones having from 3 to 50 carbon atoms per molecule, esters of organic acids having from 5 to 50 carbon atoms per molecule, and organic acids having from 4 to 50 carbon atoms per molecule.

Urea does not form adducts with branched carbon atom chain organic compounds nor with cyclic or aromatic organic compounds such as isohexane, methyloctane, cyclohexane, benzene, toluene and cymene. When employing urea in a process of this invention to separate an adduct-forming straight-chain compound from a non-adduct-forming branched-chain or cyclic compound, any one or more of the straight carbon atom organic compounds illustrated above can be admixed with one or more of the non-adduct-forming compounds.

Thiourea forms adducts with branched carbon atom chain organic compounds but does not form adducts with straight carbon atom chain organic compounds nor with aromatic compounds. Thus, adduct-forming power of thiourea is substantially opposite to that of urea in that thiourea forms adducts with branched-chain organic compounds and not with straight-chain organic compounds, while urea forms adducts with the straight-chain organic compounds but not with the branched-chain organic compounds. Thus, thiourea can form adducts with such compounds as the branched carbon atom chain alkane and alkene hydrocarbons having from 5 to 50 carbon atoms in the straight-chain portion of the molecule and from 1 to 20 carbon atoms in a side chain. Illustrative of such compounds are isohexane, ethylhexane, isohexene, isoheptane, isoheptene, ethylheptane, ethylcyclooctane, trimethylnonane, cyclohexane, cyclooctane, and methylcyclohexane. Thiourea also forms an adduct with a secondary or tertiary alcohol having from 5 to 50 carbon atoms in the straight-chain portion of the molecule and from 1 to 20 carbon atoms in the side chain; with a secondary and tertiary amine having at least 7 carbon atoms per molecule, with a mercaptan having from 5 to 50 carbon atoms in the straight chain portion of the molecule and from 1 to 20 carbon atoms in a side chain; and with a ketone having from 5 to 50 carbon atoms in the straight chain portion of the molecule and 1 to 20 carbon atoms in a side chain. Thiourea also forms an adduct with various cycloparaffins having at least 6 carbon atoms in the cyclic portion of the molecule and which can or cannot contain various side chains containing 1 or more carbon atoms per chain, such as cyclohexane, cycloheptane, cyclooctane, cyclononane, methylcyclohexane, and dimethylcyclooctane. Thiourea can be employed as the adduct-forming material to separate a mixture of one or more compounds which form adducts therewith from one or more compounds which do not form adducts with thiourea. Further, the process of this invention is applicable to the separation of an organic compound capable of forming an adduct under the particular conditions employed in an adduct-forming zone from an organic compound not capable of forming a solid adduct under those conditions even though the latter can form an adduct under conditions other than those obtaining in the adduct-forming zone. Thus, a longer chain normal paraffin such as decane will form an adduct with urea at a higher temperature than will a shorter chain normal paraffin such as heptane. Hence a mixture of longer chain and shorter chain hydrocarbons, e. g., decane and heptane, can be separated by employing an adduct-forming temperature above that of heptane but below that of decane.

As stated, a solvent-activator is preferably added to the selected amide before introducing the amide into the adduct-forming zone. The amount of such solvent-activator should be within the range of that amount required to slightly wet the surface of the amide to about 8 weight per cent of the amide. Preferably, the amount employed should be just sufficient to thoroughly wet the surface of the amide without causing any substantial dissolution thereof. This amount can be termed "activation quantity." The solvent-activators can be of the non-aqueous and aqueous types. Among the activators which can be employed are water and low-boiling non-adduct-forming oxygenated hydrocarbon derivatives. For example, methanol, ethanol, acetone, methyl ethyl ketone, propanol, secondary butyl alcohol, and the like have been found quite suitable in this process. Other activators are nitrogen-containing compounds which do not form adducts with the amide and in which the amide is soluble to an appreciable extent, say five per cent or more, or which is substantially soluble, say five per cent or more, in a mutual solvent, preferably water, in which the amide is likewise substantially soluble. The nitrogen-containing compound can be ammonia, either as liquid ammonia or a concentrated aqueous solution containing from 14 to 28 per cent or more of ammonia, or it can be an ammonia derivative selected from those substituted ammonia compounds in which the amide is soluble at least to the extent of five per cent by weight, or from those which are soluble in a mutual solvent to the extent of at least five per cent by weight, and in which the amide is likewise soluble, and such ammonia derivative can have the general formula of

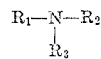

wherein $R_1$, $R_2$, and $R_3$ are selected from the group consisting of hydrogen and of the organic radicals consisting of alkyl, alkylene, hydroxy alkyl, acyl and amino alkyl radicals wherein any aliphatic carbon atom chain contains at least one but not more than five carbon atoms; provided that not more than two of $R_1$, $R_2$ and $R_3$ can be hydrogen. Thus, $R_1$, $R_2$ and $R_3$ can all be the same or different organic radicals above-enumerated, or any one or two of $R_1$, $R_2$ and $R_3$ can be hydrogen with the remaining $R_1$, $R_2$ and/or $R_3$ being one of the above radicals. Representative of the substituted ammonias are the alkyl amines wherein the alkyl group contains a total of from one to five carbon atoms, such as the mono-n-propyl, monomethyl, dimethyl, trimethyl, monoethyl, diethyl, monopropyl, di-n-propyl, monobutyl, monopentyl amines; the alkylene amines wherein the alkylene group contains from two to five carbon atoms, such as ethyleneamine and the monoallyl, monopropylene and monobutylene amines; the alkyl-alkylene amines, such as dimethylaminopropene, monoethylaminopropene, and monopropylaminoethylene; the hydroxy alkyl amines, such as monoethanolamine, diethanolamine and monopropanolamine; the amino alkyl amines, such as diethylenediamine, ethylenediamine; acyl amines or amides such as formamide and acetamide; the amines having radicals selected from two or three of the above-enumerated radicals, such as propylaminoethane, propylaminoethylene and methoxyaminobutane.

In addition to ammonia and its derivatives as above illustrated, the heterocyclic organic base amines can be employed as activators. Among such compounds can be pyrrole, pyridine, piperidine, morpholine, the picolines, the collidines, quinoline, isoquinoline, indole, pyrimidine, pyrrolidine, pyrroline, pyridazine, pyrazole, pyrazoline and pyrazine.

In general, the temperature at which the adduct is formed is below the temperature at which the adduct decomposes, and this latter temperature is dependent upon the number of carbon atoms in the organic compound adducted with the amide. The thermal stability of the adduct increases as the number of carbon atoms in the adduct with the amide increases. The adduct-forming temperature is usually not above 175° F., and a temperature within the range of minus 70 to 120° F., preferably from 60 to 80° F., is ordinarily employed. The temperature at which the adduct decomposes is higher than the adduct-forming temperature and is within the range of 80° F. to 200° F., preferably from 130 to 180° F., although higher temperatures up to the melting point of urea (271° F.) or thiourea (356° F.), as the case may be, can be employed. The aforesaid adduct-forming temperatures are maintained in adduct forming zones 10 and 50 of Figures 1 and 2, respectively, while the adduct decomposition temperatures are maintained in the adduct decomposition zones 11 and 64 of Figures 1 and 2, respectively.

Where the adduct-forming temperatures are below the freezing point of water, other activators having a freezing point below the temperature employed should be used.

The amount of amide employed to form the adduct is variable, and ordinarily a mol ratio of amide to organic compound reactive therewith within the range of 1:1 to 20:1 is used. The particle size of such amide should be within the range of 10 to 80 mesh size. The contact time of amide and the feed mixture passing through lines 17 and 54 is within the range of 1 to 60 minutes. The pressure employed in adduct forming zones 10 and 50 and in decomposition zones 11 and 64 of Figures 1 and 2, respectively, is preferably sufficient to maintain the feed mixture in a liquid state therein and can be within the range from atmospheric to 100 pounds per square inch. Preferably, the same pressure is employed in the decomposition zone of Figure 1 as in the adduct forming zone to prevent liquid transfer therebetween.

When the feed mixture is of such nature that it is viscous or a solid, such as some of the higher molecular weight materials above discussed, it is preferable to employ an inert non-adduct-forming solvent with the feed in order to render it fluid. Such solvent can be a low boiling hydrocarbon such as propane, butane or pentane, or mixtures of the same, but is preferably a portion of the carrier fluid employed in the process. The amount of solvent employed should be sufficient to dissolve or dilute the feed to the proper consistency for flow through the moving bed of amide.

The carrier fluid of this invention should be selected to be such that it is non-adduct-forming with the selected amide under the conditions of the process, is thermally stable under such conditions, is a solvent for the adduct-forming compound employed and yet is not a solvent for the selected amide or the adduct and is of a higher specific gravity than the adduct or the amide. It is preferred to employ a carrier fluid having a specific gravity of at least 1.41 and preferably within the range of 1.42 to 1.8 and having a boiling point below 260° F. A preferred class of such carrier fluids constitutes the halogenated, preferably the chlorinated and the chloro-fluorinated hydrocarbons having a specific gravity within the above range. Among such compounds are chloroform; carbon tetrachloride; dichlorofluoromethane; trichlorofluoromethane; 1,1,2-trichloroethylene; tetrachloroethylene; 1,1,2-trichloroethane; 1,1,2-trichloro-1,2,2-trifluoroethane; 1,1,1-trichloro-2,2,2-trifluoroethane; 1,2-dichloro-1,1,2,2-tetrafluoroethane and 1,1-dichloro-1,2,2,2-tetrafluoroethane. Other suitable carrier fluids can be selected by those skilled in the art by mere routine inspection of the properties of other compounds.

The amount of carrier fluid employed should be sufficient to provide a downward velocity of such fluid in vessels 23 and 65 of Figures 1 and 2, respectively, sufficient to gently agitate the particles of adducts and/or amide contained therein but not to carry such particles downwardly throughout the vessel. Such velocity is preferably within the range of 0.2 to 5 feet per minute and the exact velocity will depend upon the difference in specific gravity between the particulate material and the carrier fluid, the viscosity of the carrier fluid and the size and shape of the said particles.

As stated, a portion of the adduct-forming compound can be returned to the adduct forming zones as reflux through lines 33 and 85 of Figures 1 and 2, respectively. The amount of reflux should be sufficient to displace downwardly moving non-adduct-forming compound in the lower end of the adduct forming zones and is preferably employed in an amount within the range of 0.5 to 20 gallons per cubic foot of solid material being removed from the lower ends of the adduct forming zones.

While the invention has been described in connection with a present, preferred embodiment thereof, it is to be understood that this description is illustrative only and is not intended to limit the invention, the scope of which is defined by the appended claims.

I claim:

1. The process for separating an organic compound capable of forming a solid adduct with an amide selected from the group consisting of urea and thiourea from admixture with an organic compound not capable of forming such an adduct which comprises passing particles of said amide downwardly by gravity as an agitated columnar mass through an adduct forming zone, introducing said admixture of organic compounds into said adduct forming zone at a point intermediate its ends and at a rate within the range of 1 to 0.05 mols per mol of said amide, maintaining said adduct forming zone at a temperature within the range of minus 70 to 120° F. and under sufficient pressure to maintain liquid phase conditions therein, removing non-adduct-forming organic compound from the upper portion of said adduct forming zone, passing a resulting adduct from the lower portion of said adduct forming zone to the lower portion of a decomposition zone, forming an agitated fluent bed of amide particles in the upper portion of said decomposition zone by passing a halogenated non-adduct-forming hydrocarbon at a temperature within the range of minus 70 to 120° F. and having a solvent power for said adduct-forming compound and having a specific gravity within the range of 1.42 to 1.8 downwardly through said decomposition zone at a rate sufficient to provide therein a downward liquid velocity within the range of 0.2 to 5 feet per minute, maintaining the temperature in the lower portion of said decomposition zone within the range of 80 to 200° F., but above the thermal decomposition temperature of said adduct, passing liberated solid amide from the upper portion of said decomposition zone to the upper portion of said adduct forming zone, and returning to the lower portion of said adduct forming zone as reflux from 0.5 to 20 gallons of the separated adduct forming compound per cubic foot of solid material removed therefrom.

2. The process for separating an organic compound capable of forming a solid adduct with an amide selected from the group consisting of urea and thiourea from admixture with an organic compound not capable of forming such an adduct which comprises passing particles of said amide downwardly as columnar mass through an adduct forming zone, introducing said admixture of organic compounds into said adduct forming zone at a point intermediate its ends, maintaining said adduct forming zone at a temperature within the range of minus 70 to 120° F., passing a resulting adduct from the lower portion of said adduct forming zone to the lower portion of a decomposition zone, forming an agitated fluent bed of particles of said amide in the upper portion of said decomposition zone by passing a halogenated non-adduct forming hydrocarbon having a solvent power for said adduct-forming compound and having a specific gravity within the range of 1.42 to 1.8 downwardly through said decomposition zone at a rate sufficient to provide therein a downward liquid velocity within the range of 0.2 to 5 feet per minute, maintaining the temperature in said decomposition zone within the range of 80 to 200° F., but above the thermal decomposition temperature of said adduct, passing liberated solid amide from the upper portion of said decomposition zone to the upper portion of said adduct forming zone, and returning to the lower portion of said adduct forming zone as reflux a portion of the separated adduct forming compound.

3. The process of claim 2 wherein said amide is urea and said adduct forming compound is a straight carbon atom chain hydrocarbon having from 6 to 50 carbon atoms per molecule.

4. The process of claim 2 wherein said amide is thiourea and said adduct forming compound is a branched carbon atom chain hydrocarbon having from 3 to 50 carbon atoms in the straight chain portion of the molecule and having at least one side chain containing from 1 to 20 carbon atoms.

5. The process for separating an organic compound capable of forming an adduct with an amide selected from the group consisting of urea and thiourea from admixture with an organic compound not capable of forming such an adduct which comprises passing particles of said amide downwardly as a moving mass through an adduct forming zone, introducing said admixture of organic compounds into said adduct forming zone, maintaining said adduct forming zone under such conditions that said adduct forming compound will react with said amide, passing a resulting adduct from the lower portion of said adduct forming zone to the lower portion of a decomposition zone, forming a fluent bed of said adduct and amide in the upper portion of said decomposition zone by passing a non-adduct forming halogenated hydrocarbon carrier liquid having a solvent power for said adduct forming compound and having a specific gravity within the range of 1.42 to 1.8 downwardly through said decomposition zone at a rate sufficient to provide a downward liquid velocity within the range of 0.2 to 5 feet per minute, maintaining the temperature in the lower portion of said decomposition zone sufficiently high to decompose said adduct and passing liberated solid amide from the upper portion of said decomposition zone to the upper portion of said adduct forming zone.

6. The process for separating an organic compound capable of forming a solid adduct with an amide selected from the group consisting of urea and thiourea from admixture with an organic compound not capable of forming such an adduct which comprises contacting said amide with said admixture to form said adduct in an adduct forming zone, passing a resulting adduct from said adduct forming zone to the lower portion of a decomposition zone, passing a non-adduct forming halogenated hydrocarbon carrier fluid having a solvent power for said adduct-forming compound and having a specific gravity within the range of 1.42 to 1.8 downwardly through said decomposition zone at a rate sufficient to provide a downward liquid velocity therein to form a fluent bed of said adduct and said amide in the upper portion of said decomposition zone, decomposing said adduct and passing liberated solid amide from the upper portion of said decomposition zone to the upper portion of said adduct forming zone.

7. The process for separating an organic compound capable of forming a solid adduct with an amide selected from the group consisting of urea and thiourea from admixture with an organic compound not capable of forming such an adduct which comprises passing particles of said amide downwardly by gravity as an agitated columnar mass through an adduct forming zone, introducing said admixture of organic compounds into said adduct forming zone at a point intermediate its ends and at a rate within the range of .1 to 0.05 mol per mol of said amide, maintaining said adduct forming zone at a temperature within the range of minus 70 to 120° F. and under sufficient pressure to maintain liquid phase conditions therein, removing non-adduct forming compound from the upper portion of said adduct forming zone, forming a slurry of the resulting adduct from the lower portion of said adduct forming zone with a non-adduct forming liquid compound, filtering said slurry to remove non-adduct forming compounds therefrom, passing the resulting adduct to the lower portion of a decomposition zone, forming a plurality of succeeding agitated fluent beds of said adduct and the resulting amide in said decomposition zone, passing a halogenated non-adduct forming hydrocarbon carrier fluid having a solvent power for said adduct-forming compound and having a specific gravity within the range of 1.42 to 1.8 downwardly through said decomposition zone to provide therein a downward liquid velocity within the range of 0.2 to 5 feet per minute, said carrier fluid being at a temperature within the range of minus 70 to 120° F., passing said adduct and the resulting amide particles upwardly from bed to bed through quiescent columns of said carrier fluid, maintaining the temperature in the lower portion of said decomposition zone within the range of 80 to 200° F. but higher than the thermal decomposition temperature of said adduct, passing liberated solid amide from the upper portion of said decomposition zone to the upper portion of said adduct forming zone, and returning to the lower portion of said adduct forming zone as reflux from 0.5 to 20 gallons of the separated adduct forming compound per cubic foot of solid material removed therefrom.

8. The process for separating an organic compound capable of forming an adduct with an amide selected from the group consisting of urea and thiourea from admixture with an organic compound not capable of forming such an adduct which comprises passing particles of said amide as a columnar mass through an adduct forming zone, introducing said admixture of organic compounds into said adduct forming zone, maintaining said adduct forming zone at a temperature within the range of minus 70 to 120° F., forming a slurry of the resulting adduct with a non-adduct forming liquid compound, filtering said slurry to remove non-adduct forming compounds therefrom, passing the resulting adduct to the lower portion of a decomposition zone, forming a plurality of succeeding agitated fluent beds of said adduct and the resulting amide in said decomposition zone, passing a non-adduct forming halogenated hydrocarbon carrier fluid having a solvent power for said adduct-forming compound and having a specific gravity within the range of 1.42 to 1.8 downwardly through said decomposition zone to provide therein a downward liquid velocity within the range of 0.2 to 5 feet per minute, passing said adduct and the resulting amide particles upwardly from bed to bed through quiescent columns of said carrier fluid, maintaining the temperature in the lower portion of said decomposition zone within the range of 80 to 200° F. but higher than the thermal decomposition temperature of said adduct, and passing liberated solid amide from the upper portion of said decomposition zone to the upper portion of said adduct forming zone.

9. The process of claim 8 wherein said organic compound capable of forming an adduct is a straight carbon atom chain hydrocarbon having from 6 to 50 carbon atoms per molecule and wherein said amide is urea.

10. The process of claim 8 wherein said organic compound capable of forming an adduct is a branched carbon atom chain hydrocarbon having from 3 to 50 carbon atoms in the straight chain portion of the molecule and a side chain containing from 1 to 20 carbon atoms and wherein said amide is thiourea.

11. The process for separating an organic compound capable of forming an adduct with an amide selected from the group consisting of urea and thiourea from admixture with an organic compound not capable of forming such an adduct which comprises passing said amide through an adduct forming zone, introducing said admixture of organic compounds into said adduct forming zone, maintaining said adduct forming zone at a temperature sufficiently high to cause said adduct forming compound to react with said amide, passing the resulting adduct to the lower portion of a decomposition zone, forming a plurality of succeeding fluent beds of said adduct and the resulting amide in said decomposition zone, passing a non-adduct forming halogenated hydrocarbon carrier fluid having a solvent power for said adduct-forming compound and having a specific gravity within the range of 1.42 to 1.8 downwardly through said decomposition zone to provide therein a downward liquid velocity sufficient to form said beds, passing said adduct and the resulting amide particles upwardly from bed to bed through a quiescent column of said carrier fluid, maintaining the temperature in the lower portion of said decomposition zone sufficiently high to decompose said adduct, and passing liberated solid amide from the upper portion of said decomposition zone to the upper portion of said adduct forming zone.

12. The process for separating an organic compound capable of forming an adduct with an amide selected from the group consisting of urea and thiourea from admixture with an organic compound not capable of forming such an adduct which comprises reacting said admixture with said amide to form an adduct in an adduct forming zone, passing the resulting adduct to the lower portion of a decomposition zone, forming a plurality of fluent beds of said adduct and the resulting amide in said decomposition zone, passing a non-adduct forming halogenated hydrocarbon carrier fluid having a solvent power for said adduct-forming compound and having a specific gravity within the range of 1.42 to 1.8 downwardly through said decomposition zone, passing said adduct and the resulting amide particles upwardly from bed to bed in said decomposition zone, and decomposing said adduct to liberate said amide.

13. A process for concomitantly elevating and decomposing an adduct formed by reacting an adduct-forming organic compound with an amide selected from the group consisting of urea and thiourea and concomitantly agitating and washing the regenerated amide free of occluded impurities which comprises passing said adduct into the lower portion of a decomposition zone, passing a non-adduct-forming halogenated hydrocarbon carrier fluid having a solvent power for said adduct-forming compound and not having a solvent power for said amide and having a specific gravity within the range of 1.42 to 1.8 into the upper portion of said zone and maintaining said zone at a temperature sufficiently high to decompose said adduct.

14. The process of claim 13 wherein said carrier fluid is heated to a temperature sufficiently high to cause said adduct to decompose.

15. The process of claim 13 wherein said carrier fluid is heated to a temperature within the range of 130 to 180° F.

CHARLES S. LYNCH.

References Cited in the file of this patent

UNITED STATES PATENTS

| Number | Name | Date |
|---|---|---|
| 2,499,820 | Fetterly | Mar. 7, 1950 |

FOREIGN PATENTS

| Number | Country | Date |
|---|---|---|
| 17,339 of 1947 | Australia | Feb. 12, 1948 |